United States Patent
Watanabe

(10) Patent No.: US 6,918,507 B2
(45) Date of Patent: Jul. 19, 2005

(54) FIXING STRUCTURE

(75) Inventor: Takuya Watanabe, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/389,914

(22) Filed: Mar. 18, 2003

(65) Prior Publication Data

US 2003/0178424 A1 Sep. 25, 2003

(30) Foreign Application Priority Data

Mar. 22, 2002 (JP) ........................................ 2002-080279

(51) Int. Cl.[7] .............................................. B65D 41/16
(52) U.S. Cl. ........................ 220/786; 220/4.02; 217/56
(58) Field of Search ................................ 220/786, 787, 220/783, 784, 788, 789, 792, 4.02, 297, 298, 300–302, FOR 100, FOR 101, 314; 215/317, 321; 217/56, 76, 81, 124, 3 CV

(56) References Cited

U.S. PATENT DOCUMENTS 1,132,925 A * 3/1915 Sher ............................ 220/786
3,023,925 A * 3/1962 Sher ............................ 220/786
3,464,582 A * 9/1969 Morris et al. ................ 220/786
3,537,611 A * 11/1970 Heinz ........................... 220/210
3,620,405 A * 11/1971 Peters et al. ............. 220/259.3
6,659,274 B2 * 12/2003 Enners ....................... 206/305

FOREIGN PATENT DOCUMENTS

FR          2624100     *  6/1989    ................ 220/786

* cited by examiner

Primary Examiner—Lien M. Ngo
(74) Attorney, Agent, or Firm—Oliff & Berridge, PLC

(57) ABSTRACT

A fixing structure for fixing a case main body with a lid includes fitting portions provided for the case main body and the lid respectively. One of the fitting portions includes a fitting bore having an engagement bore to be engaged by the other of the fitting portions and a bore extending from a fitting direction terminal part of the engagement bore in a fitting direction. The other of the fitting portions includes a fitting projection portion having an engaging projection portion provided at a position corresponding to the engagement bore and a guide projection portion provided at a position corresponding to the bore. The guide projection portion has a fitting guide portion, the height of which decreases from engaging projection portion side thereof toward an end part of the guide projection portion.

3 Claims, 5 Drawing Sheets

FIXING STRUCTURE

The present disclosure relates to the subject matter contained in Japanese Patent Application No. 2002-080279 filed Mar. 22, 2002, which is incorporated herein by reference in its entirety.

BACKGROUND OF THE INVENTION

1. Field of the Invention

The present invention relates to a fixing structure between a supporter and a supported member, and more particularly to a fitting structure between a case main body and a lid, for instance.

2. Description of the Related Art

Two examples of fitting structures between a case main body and a lid for a conventional storage container, which can store essential parts of an electronic apparatus or the like, will be described below with reference to FIGS. 4A to 5E. Other parts than fitting portions in the conventional storage container as shown in FIGS. 4A to 5E are roughly the same as those shown in FIGS. 1A and 1B which will be used for explaining an embodiment of the invention.

Referring firstly to FIGS. 4A to 4E, a first conventional example will be described below. FIGS. 4A to 4E are views showing fitting portions for a case main body and a lid in the first conventional example. FIG. 4A is a front view of a fitting portion in the case main body, FIG. 4B is a front view of a fitting portion in the lid, FIG. 4C is a cross-sectional view taken along the line F—F, FIG. 4D is a front view of the case main body and the lid in a fitted state, and FIG. 4E is a cross-sectional view taken along the line G—G.

A storage container for storing the essential parts of an electronic apparatus in the first conventional example comprises the case main body 60 and the lid 70.

The case main body 60 is a box-type case with rectangular bottom, and formed with a square engagement bore 61 near an opening portion in the almost central part of four opposed sides of the rectangle. A position regulating bore 62 notched from an end face of the opening portion is formed near the engagement bore 61. The case main body 60 is made of resin and formed by injection molding.

The lid 70 is fitted with the case main body 60, and is formed like a plate of almost square shape engaging an inner bore of the opening portion in the case main body 60. On four faces of the lid 70 along an outer peripheral direction, there are formed an engagement convex portion 71 for engaging with the engagement bore 61 in the case main body 60 and a position regulating convex portion 72 for engaging with the position regulating bore 62. The engagement convex portion 71 and the position regulating convex portion 72 project from the outer periphery of the lid 70. The engagement convex portion 71 is formed with an engagement face 73 for engaging the engagement bore 61 and an insertion guide portion 74 (triangular cubic shape) that inclines from almost central part of a top face of the engagement convex portion 71 to the outer peripheral direction or downward as shown in the figure. The lid 70 is made of resin and formed by injection molding.

A fitting method for the case main body and the lid will be described below.

When the lid 70 is fitted and inserted into the opening portion of the case main body 60, the insertion guide portion 74 of the engagement convex portion 71 forces the opening portion of the case main body 60 to be expanded from inner to outer direction. And when the engagement face 73 of the engagement convex portion 71 reaches an engagement side 63 of the engagement bore 61, the expanded opening portion of the case main body 60 is restored to its original state. And the engagement face 73 of the engagement convex portion 71 and the engagement side 63 of the engagement bore 61 engage. At the same time, a bottom portion 75 of the position regulating convex portion 72 for the lid 70 makes contact with a bottom portion 64 of the position regulating bore 62 of the case main body 60 to regulate the position in an inserting direction. Accordingly, the case main body 60 and the lid 70 are regulated in position in both the inserting and drawing directions and held in the fitted state.

Referring to FIGS. 5A to 5E, a second conventional example will be described below. FIGS. 5A to 5E are views showing fitting portions for the case main body and the lid in the second conventional example. FIG. 5A is a front view of a fitting portion in the case main body, FIG. 5B is a front view of a fitting portion in the lid, FIG. 5C is a cross-sectional view taken along the line H—H, FIG. 5D is a front view of the case main body and the lid in a fitted state, and FIG. 5E is a cross-sectional view taken along the line J—J. The second conventional example is almost the same as the first conventional example, except for the position regulating method for the case main body and the lid. Different parts from the first conventional example are mainly described and other parts are simplified or not described.

A storage container for storing the essential parts of an electronic apparatus in the second conventional example comprises the case main body 80 and the lid 90.

The case main body 80 is formed with a position regulating portion 83 like a rib extending from a bottom portion to the opening portion along the inner periphery of the case main body 80 to implement the position regulating method for the case main body 80 and the lid 90 in the inserting direction. An end face of the position regulating portion 83 in opening direction serves as a position regulating face 84 for the lid 90. The position regulating portion 83 is provided on the four corner portions of the case main body 80, for example. The case main body 80 is almost the same as in the first conventional example, except for the position regulating method.

The lid 70 has a position regulating method for the lid 90 and the case main body 80 in the inserting direction by bringing a lower face 93 of the lid 90 in inserting direction into contact with a position regulating face 84 of a position regulating portion 83 of the case main body 80. The lid 90 is almost the same as the lid 70 in the first conventional example, except that there is not the position regulating convex portion 72 of the lid 70 in the first conventional example.

A fitting method for the case main body and the lid will be described below.

When the lid 90 is fitted and inserted into the opening portion of the case main body 80, an insertion guide portion 94 of an engagement convex portion 91 forces an opening portion of the case main body 80 to be expanded from inner to outer direction. And when an engagement face 95 of the engagement convex portion 91 reaches an engagement side 82 of an engagement bore 81, the expanded opening portion of the case main body 80 is restored to its original state. And the engagement face 95 of the engagement convex portion 91 and the engagement side 82 of the engagement bore 81 engage. At the same time, a lower face 93 of the lid 90 in an inserting direction makes contact with a position regulating face 84 of the position regulating portion 83 of the case main body 80 to regulate the position in the inserting direction.

Accordingly, the case main body 80 and the lid 90 are regulated in both the inserting and drawing directions and held in the fitted state.

However, in the fitting structure for the case main body 60 and the lid 70 in the first conventional example, the engagement face 73 of the engagement convex portion 71 of the lid 70 is engaged with the engagement side 63 of the engagement bore 61 of the case main body 60 against a drawing force, and against an inserting force, the lid 70 is provided with the position regulating convex portion 72 at a position apart from the engagement convex portion 71, and the case main body 60 is provided with the position regulating bore 62 at a position corresponding to the position regulating convex portion 72, whereby the bottom portion 75 of the position regulating convex portion 72 is brought into contact with the bottom portion 64 of the position regulating bore 62. Accordingly, since the position is regulated in both the inserting and drawing directions, the fitting portions become loose if there is dispersion in the size of associated portions. Thus, if the size of associated portions is managed strictly to remove looseness, there is a fear that the cost for the case main body 60 and the lid 70 increases.

Also, in the fitting structure for the case main body 80 and the lid 90 in the second conventional example, the position of the lid 90 is regulated in the inserting direction by bringing the lower face 93 of the lid 90 in the inserting direction into contact with the position regulating face 84 of the position regulating portion 83 in the case main body 80. However, with this method, because the position regulating portion 83 is provided inside the case main body 80, the internal volume of the case main body 80 is reduced by the volume of the position regulating portion 84. Accordingly, the total size of the case main body is increased by the volume of the position regulating portion 84 to obtain a desired internal volume, making it difficult to miniaturize the case main body. In addition, the position of the lid is regulated in both the inserting and drawing directions as in the first conventional example, whereby if there is dispersion in the size of associated portions, the fitting portions become loose. Thus, if the size of associated portions is managed strictly to remove looseness, there is a fear that the cost for the case main body 80 and the lid 90 increases.

SUMMARY OF THE INVENTION

The present invention has been achieved to solve the above-mentioned problems, and it is an object of the invention to provide a fitting structure capable of fixing a case main body and a lid securely without looseness in the fitting portions in which the fitting portions for the case main body and the lid can be regulated in position in both the inserting and drawing directions.

In order to accomplish the above object, the prevent invention provides a fixing structure for fixing a supporter with a supported member, comprising: fitting portions provided for the supporter and the supported member respectively, wherein one of the fitting portions includes a fitting bore having an engagement bore to be engaged by the other of the fitting portions and a bore extending from a fitting direction terminal part of the engagement bore in a fitting direction, the other of the fitting portions includes a fitting projection portion having an engaging projection portion provided at a position corresponding to the engagement bore and a guide projection portion provided at a position corresponding to the bore, and the guide projection portion has a fitting guide portion, the height of which decreases from engaging projection portion side thereof toward an end part of the guide projection portion.

Also, the invention provides the fixing structure between supporter and supported member, wherein the engaging projection portion is provided with a rattle preventing projection portion, the height of which is lower than the engaging projection portion and decreases toward a direction opposite to the fitting direction, the rattle preventing projection portion is disposed at the opposite side of the guide projection portion

DETAILED DESCRIPTION OF THE PREFERRED EMBODIMENTS

Referring to FIGS. 1A to 2E, a first embodiment of the present invention will be described below.

Figure 1A:
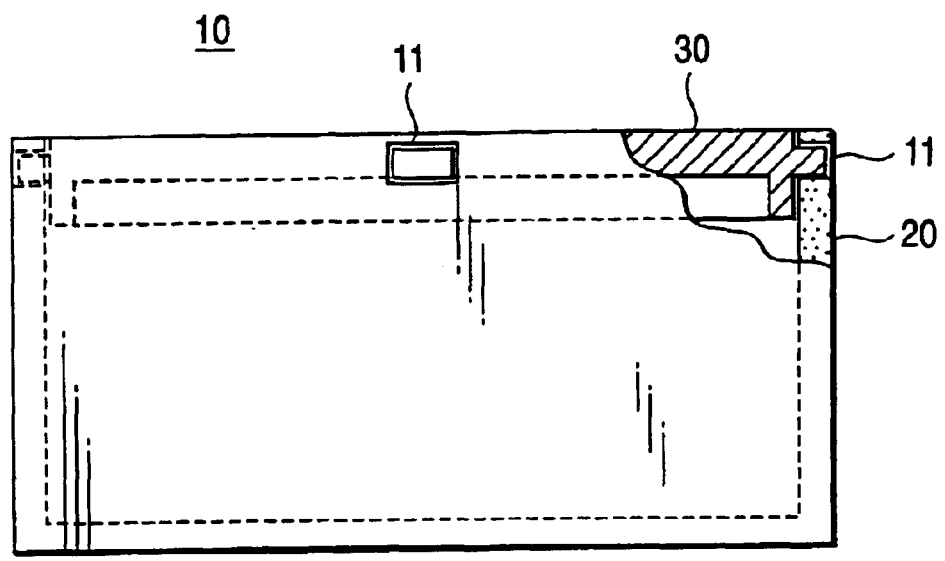
FIGS. 1A and 1B are schematic views showing a fitting structure of a case main body and a lid according to an embodiment of the present invention.
Figure 1B:
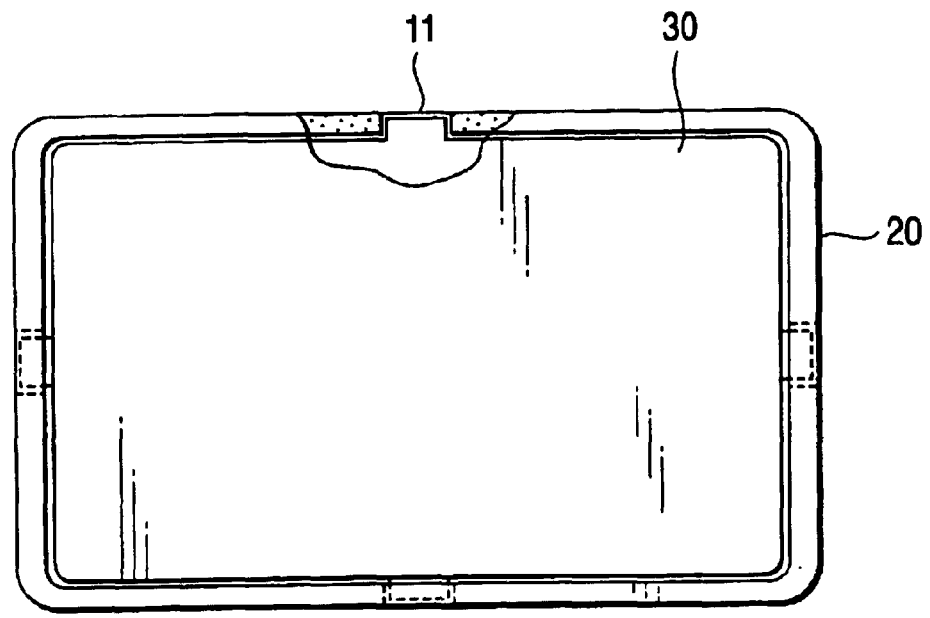
Figure 2A:
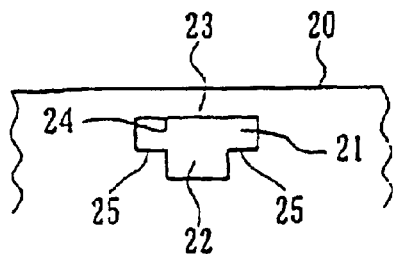
FIGS. 2A to 2E are views showing fitting portions of the case main body and the lid according to a first embodiment of the invention.
Figure 2B:
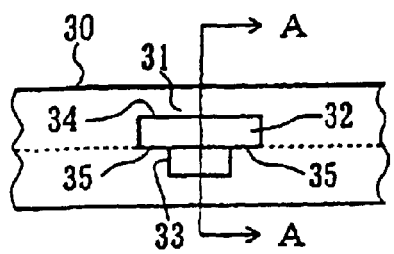
Figure 2C:
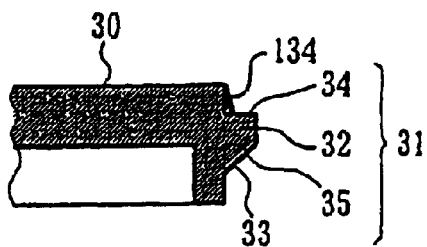
Figure 2D:
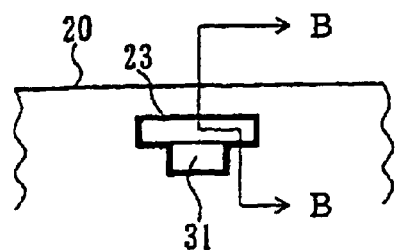
Figure 2E:
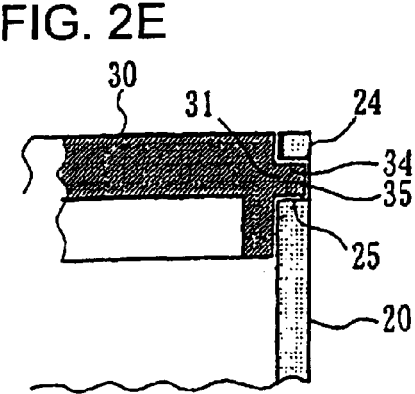

FIGS. 1A and 1B are a schematic views showing a fitting structure for a case main body and a lid according to an embodiment of the invention. FIG. 1A is a front view (partially in cross section) and FIG. 1B is a plan view (partially in cross section). FIGS. 2A to 2E are views showing fitting portions 11 of the case main body and the lid according to a first embodiment of the invention. FIG. 2A is a front view of a fitting portion in the case main body, FIG. 2B is a front view of a fitting portion in the lid, FIG. 2C is a cross-sectional view taken along the line A—A, FIG. 2D is a front view of the case main body and the lid in a fitted state, and FIG. 2E is a cross-sectional view taken along the line B—B.

Reference numeral 10 denotes a storage container for storing the essential parts of an electronic apparatus. The storage container comprises a case main body 20 and a lid 30.

The case main body 20 is a box-type case with rectangular bottom, and formed with a T-type engagement bore 23 of T-character shape near opening portion in the almost central part of each of four opposed sides of the rectangle. The T-type engagement bore 23 has a transverse bore part 21 extending in the same direction as an end face of the opening and a longitudinal bore part 22 extending from a central part of the transverse bore part 21 toward a bottom portion. The case main body 20 is made of resin and formed by injection molding.

The lid 30 is fitted with the case main body 20, and is a plate of almost square shape engaging an inner bore of the opening portion in the case main body 20. On four faces of the lid 30 along an outer peripheral direction, there are formed a T-type engagement convex portion 31 for engaging a T-type engagement bore 23 in the case main body 20. Each T-type engagement convex portion 31 projects from the outer peripheral face. The T-type engagement convex portion 31 has a transverse convex portion 32 for engaging the transverse bore part 21 of the T-type engagement bore 23, and an insertion guide portion 33 for engaging the longitudinal bore part 22. The insertion guide portion 33 has a triangular cubic shape that inclines from the top of a convex face of the transverse convex portion 32 to the outer peripheral direction or downward as shown in the figure. The lid 30 is made of resin and formed by injection molding.

A fitting method for the case main body and the lid will be described below.

When the lid 30 is fitted and inserted into the opening portion of the case main body 20, the insertion guide portion 33 of the T-type engagement convex portion 31 forces the opening portion of the case main body 20 to be expanded from inner to outer direction. And when an upper engagement face 34 and a lower engagement face 35 of the transverse convex portion 32 of the T-type engagement convex portion 31 reach an upper engagement side 24 and a lower engagement side 25 of the transverse bore part 21 of the T-type engagement bore 23, the T-type engagement convex portion 31 engages the T-type engagement bore 23. And the expanded opening portion of the case main body 60 is restored to its original state upon engagement. In this state, the case main body 20 and the lid 30 are regulated in both the inserting and drawing directions and held in the fitted state.

As above described, with the fitting structure for the case main body 20 and the lid 30 according to the first embodiment of the invention, the transverse bore part 21 of the T-type engagement bore 23 in the case main body 20 and the transverse convex portion 32 of the T-type engagement convex portion 31 in the lid 30 engage, so that the case main body 20 and the lid 30 are securely kept fitted against forces in both the inserting and drawing directions. In this manner, a member for engagement in both the upper and lower directions is integrally formed, whereby there is smaller dispersion in the size of the fitting portions, so that the fitting portions become less loose with the increased quality of fitting. Since the fitting portions are constructed within a plate thickness of the outer peripheral part of the case main body 20, it can easily dealt with miniaturization.

In the first embodiment of the invention, one fitting portion (for the case main body 20) is the T-type engagement bore 23 of T-character shape including the transverse bore part 21 and the longitudinal bore part 22, and the other fitting portion (for the lid 30) is the T-type engagement convex portion 31 having the transverse convex portion 32 and the insertion guide portion 33. However, the transverse bore part 21 and the longitudinal bore part 22 are not necessarily the T-character shape, but may be provided slightly apart. In this instance, the T-type engagement convex portion 31 has the transverse convex portion 32 and the insertion guide portion 33 provided apart to be aligned with the bore on the other side. In this case, it is required that the size of the insertion guide portion in the inserting direction is at least longer than the size of the transverse bore portion in the inserting direction not to be engaged in passing the transverse bore portion when fitted.

Referring to FIGS. 3A to 3F, a second embodiment of the invention will be described below.

Figure 3A:
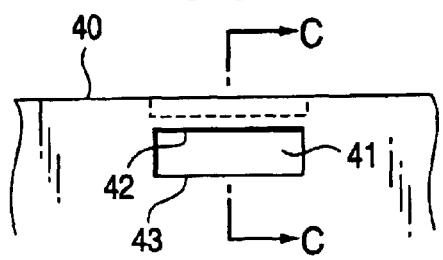
FIGS. 3A to 3F are views showing fitting portions of the case main body and the lid according to a second embodiment of the invention.
Figure 3B:
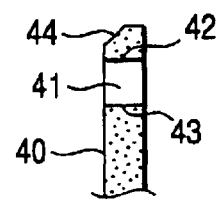
Figure 3C:
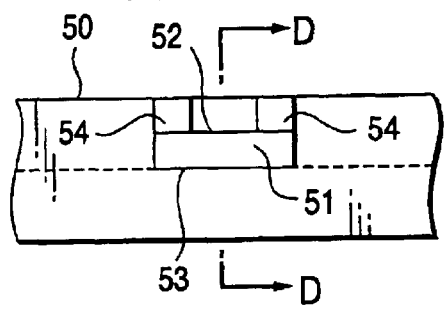
Figure 3D:
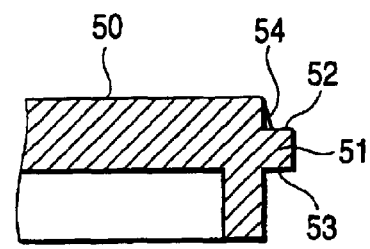
Figure 3E:
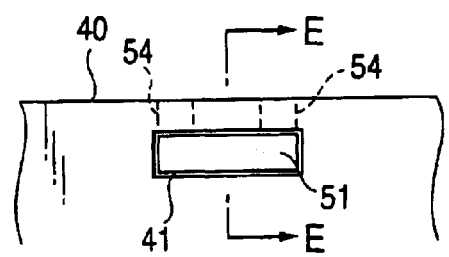
Figure 3F:
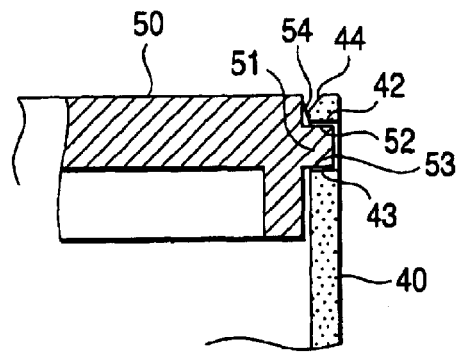
Figure 4A:
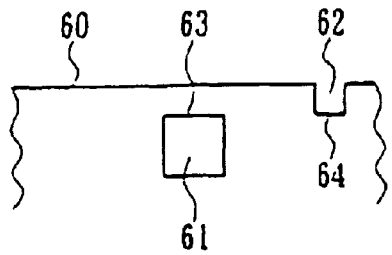
FIGS. 4A to 4E are views showing fitting portions for a case main body and a lid in a conventional example.
Figure 4B:
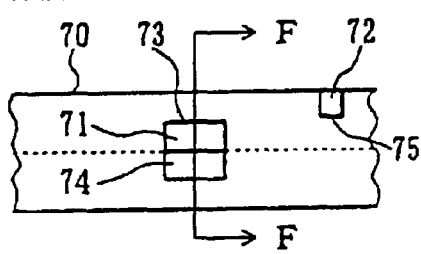
Figure 4C:
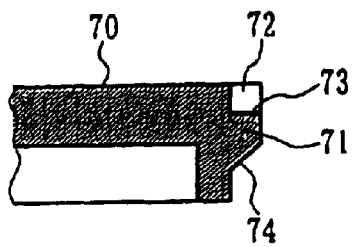
Figure 4D:
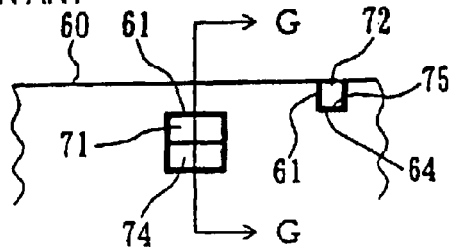
Figure 4E:
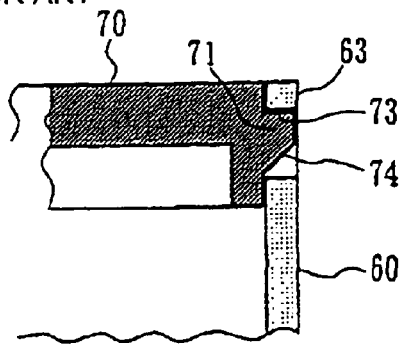
Figure 5A:
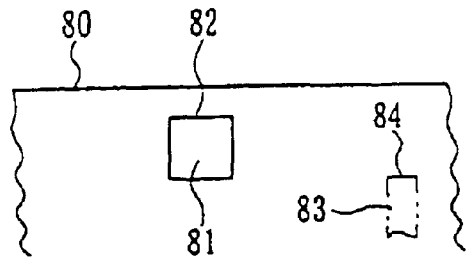
FIGS. 5A to 5E are views showing fitting portions for a case main body and a lid in a second conventional example.
Figure 5B:
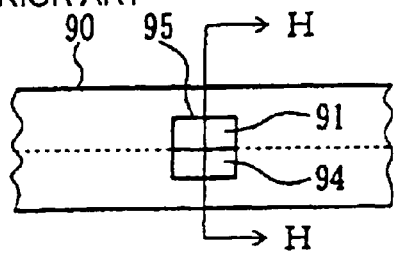
Figure 5C:
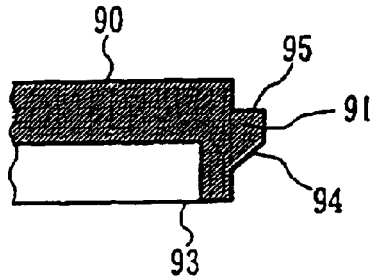
Figure 5D:
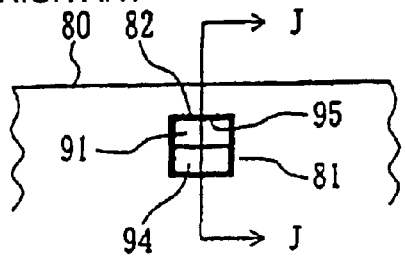
Figure 5E:
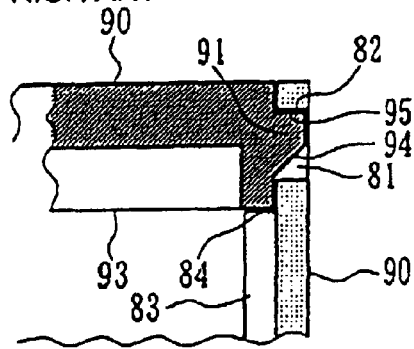

FIGS. 3A to 3F are views showing fitting portions for a case main body and a lid according to a second embodiment of the invention. FIG. 3A is a front view of a fitting portion in the case main body, FIG. 3B is a cross-sectional view taken along the line C—C, FIG. 3C is a front view of a fitting portion in the lid, FIG. 3D is a cross-sectional view taken along the line D—D, FIG. 3E is a front view of the case main body and the lid in a fitted state, and FIG. 3F is a cross-sectional view taken along the line E—E. A storage container of the second embodiment is almost the same as in the first embodiment shown in FIGS. 1A and 1B, except that the fitting portion is partially varied from the first embodiment.

The case main body 40 is a box-type case with rectangular bottom, and formed with an engagement bore 41 extending in the same direction as en end face of the opening portion in the almost central part of four opposed sides of the rectangle. Also, an insertion guide portion 44 is formed over a range slightly longer than the engagement bore 41, the insertion guide portion 44 inclining from an inner face part closer to the end face of the opening than an upper engagement face 42 of the engagement bore 41 in an outer direction toward the end face of the opening. The case main body 40 is made of resin and formed by injection molding.

A lid 50 is fitted with the case main body 40, and is a plate of almost square shape engaging an inner bore of the opening portion in the case main body 40. On four faces of the lid 50 along an outer peripheral direction, there is formed an engagement convex portion 51 for engaging the engagement bore 41 in the case main body 40. Each engagement convex portion 51 projects from the outer peripheral face. A gap correcting convex portion 54 is formed on both the left and right sides of an upper engagement face 52 of the engagement convex portion 51. The gap correcting convex portion 54 has a triangular cubic shape connecting to the upper engagement face 52, and is inclining from a predetermined height of the outer peripheral face toward an upper end face of the lid 50. The lid 50 is made of resin and formed by injection molding.

A fitting method for the case main body and the lid will be described below.

When the lid 50 is fitted and inserted into the opening portion of the case main body 40, a lower engagement face 53 of the engagement convex portion 51 is guided by the insertion guide portion 44 formed in the opening portion of the case main body 40 to force the opening portion of the case main body 40 to be expanded outwards. And when an upper engagement face 52 and a lower engagement face 53 of the engagement convex portion 51 reach an upper engagement side 42 and a lower engagement side 43 of the engagement bore 41, the engagement convex portion 51 engages the engagement bore 41. And the expanded opening portion of the case main body 40 is restored to its original state upon engagement, but brought into contact with the gap correcting convex portions 54 connecting to the upper engagement face 52 of the engagement convex portion 51. In this state, the case main body 40 and the lid 50 are regulated in both the inserting and drawing directions and held in the fitted state.

As above described, with the fitting structure for the case main body 40 and the lid 50 according to the second embodiment of the invention, the engagement bore 41 in the case main body 40 and the engagement convex portion 51 in the lid 50 engage at two positions, so that the case main body 40 and the lid 50 are securely kept fitted against forces in both the inserting and drawing directions. Accordingly, there is smaller dispersion in the size of the fitting portions, whereby the fitting portions become less loose with increased quality of fitting. Also, the gap correcting convex portions 54 provided in the lid 50 are brought into contact with the opening portion of the case main body 40, whereby it is possible to suppress the fitting portions from being loose, even if there is any dispersion in the size between the outer periphery of the lid 50 and the inner periphery of the case main body 40. Since the fitting portions of the case main body 40 and the lid 50 are constructed within a plate thickness of the outer peripheral part of the case main body 40, it can easily dealt with miniaturization.

In the fitting structure for the case main body and the lid according to the first and second embodiments of the invention, the fitting portion is provided on each of four opposed sides of square shape, but the number of fitting portions may be increased or decreased depending on the size and shape of the case main body and the lid, and the required strength of the fitting portion. Also, the engagement bore is provided in the case main body and the engagement convex portion for engaging the engagement bore is provided in the lid. Besides that, the engagement convex portion may be provided in the case main body and the engagement bore may be provided in the lid. In this case, it is necessary that the insertion guide portion of the engagement convex portion is directed in the opposite direction to the above embodiment.

The fitting structure for the case main body and the lid has been described above. However, the invention is not limited thereto, but may be broadly employed for a fixing structure (fitting structure) for trays of a steel rack, for instance, in which the supporting components fix the supported component.

This invention covers the following constitutions.

A fixing structure between a supporter and a supported member for fixing the supported member with the supporter by fitting portions provided for the supporter and the supported member, wherein one of the fitting portions is a fitting bore which is a combination of a first long bore extending in a fitting direction that is a direction for moving the supporter or the supported member at the time of fitting and a second long bore extending in a direction crossing the first long bore, and the other of the fitting portions is a fitting projection which is a combination of a first projection provided at a position corresponding to the first long bore and a second projection provided at a position corresponding to the second long bore, the first projection has a fitting guide portion extending from a central part of the first projection toward the fitting bore at the time of fitting, the height of the fitting guide portion decreasing toward an end part of the first projection, and the second projection has an engagement portion for engaging an edge of the second long bore.

The fixing structure between supporter and supported member, wherein the first projection is provided with a rattle preventing portion 134 (FIG. 2C) at an opposite side of the fitting guide portion, a portion of the rattle preventing portion having a height that is below a predetermined value has an inclined shape and the height of projection decreases from the central part of projection toward the projection end part and a portion having the height of projection at or above the predetermined value or more has a step shape of rising perpendicularly.

As above described, with this invention, it is possible to provide an inexpensive fitting structure for fixing the case main body and the lid securely without looseness in the fitting portions in which the fitting portions for the case main body and the lid can be regulated in position in both the inserting and drawing directions.

What is claimed is:

1. A fixing structure for fixing a supporter with a supported member, comprising:

fitting portions provided for the supporter and the supported member respectively, wherein one of the fitting portions includes a fitting bore having a transverse engagement bore to be engaged by the other of the fitting portions and a longitudinal bore extending from a fitting direction terminal part of the transverse engagement bore in a fitting direction, the longitudinal bore having a width in a transverse direction that is different from a width of the transverse engagement bore in the transverse direction, the other of the fitting portions includes a fitting projection portion having an engaging projection portion provided at a position corresponding to the transverse engagement bore and a guide projection portion provided at a position corresponding to the longitudinal bore, and the guide projection portion has a fitting guide portion, the height of which decreases from engaging projection portion side thereof toward an end part of the guide projection portion.

2. A fixing structure for fixing a supporter with a supported member, comprising:

fitting portions provided for the supporter and a supported member respectively, wherein one of the fitting portions includes a fitting bore having an engagement bore to be engaged by the other of the fitting portions and a bore extending from a fitting direction terminal part of the engagement bore in a fitting direction, the other of the fitting portions includes a fitting projection portion having an engaging projection portion provided at a position corresponding to the engagement bore and a guide projection portion provided at a position corresponding to the bore, and the guide projection portion has a fitting guide portion, the height of which decreases from engaging projection portion side thereof toward an end part of the guide projection portion, wherein the engaging projection portion is provided with a rattle preventing projection portion, the height of which is lower than the engaging projection portion and decreases toward a direction opposite to the fitting direction, the rattle preventing projection portion is disposed at the opposite side of the guide projection portion.

3. The fixing structure according to claim 1, wherein the width of the longitudinal bore in the transverse direction is less than the width of the transverse engagement bore in the transverse direction.

* * * * *